Oct. 10, 1967 L. E. FOWLER 3,346,871

DEVICE FOR ATTACHMENT OF A RECORDING ARM TO A DRIVE MECHANISM WITH ADJUSTABLE BIAS FORCE

Filed March 21, 1966 3 Sheets-Sheet 1

INVENTOR.
LESLIE E. FOWLER

BY A. M. Fernandez

ATTORNEY

INVENTOR.
LESLIE E. FOWLER

BY A. M. Fernandez

ATTORNEY

INVENTOR.
LESLIE E. FOWLER

BY A. M. Fernandez

ATTORNEY

United States Patent Office 3,346,871
Patented Oct. 10, 1967

3,346,871

DEVICE FOR ATTACHMENT OF A RECORDING ARM TO A DRIVE MECHANISM WITH ADJUSTABLE BIAS FORCE

Leslie E. Fowler, Arlington Heights, Ill., assignor to Beckman Instruments, Inc., a corporation of California Filed Mar. 21, 1966, Ser. No. 535,795
10 Claims. (Cl. 346—139)

This invention relates to recorders of either the direct-writing-oscillograph type or of the servo-motor-operated type, and more particularly to an improved structure which provides a means for connecting a stylus arm to a drive mechanism and a means for adjusting the bias force of the stylus arm against a record medium for proper recording.

In direct-writing oscillographic recorders, the writing medium, either ink, heat or electric current, determines what bias force is necessary on the stylus arm against the record medium to provide optimum recording characteristics. In recorders which have the basic capability of recording with all three types of writing media, it is desirable to provide a means for adjusting the bias force for each type to achieve optimum operation. Such a means can be provided as an integral, or additional, part of the stylus arm structure itself, but usually that approach adds mass to the stylus which is detrimental to the frequency response capability of the recorder. Providing the adjusting means at or near the point of connection of the stylus arm to the drive mechanism will add mass at or near the center of rotation of the unit which has substantially less effect on the frequency response capability.

It is desirable that the structure which provides the connecting means also provide the adjusting means for compactness and least mass. The adjusting means, especially for recorders with the capability of using different types of writing media, should allow for easy and rapid insertion and removal of the stylus arm. At the same time, the connecting means should provide a rigid mechanical connection between the stylus arm and drive mechanism without play or backlash, even under extremely high acceleration conditions.

Accordingly, the primary object of this invention is to provide an improved means for connecting a stylus arm to a drive mechanism. A further object is to provide an improved means for adjusting the bias force of a stylus arm for proper recording.

These and other objects are achieved in accordance with the present invention by providing a cradle rigidly attached to a drive shaft of a servo-motor or galvanometer, or to a link of a rectilinear recording mechanism. The top of the cradle is relieved or otherwise provided with upright members each of which has a slot or V-type bearings to support a trunnion extending from either side of a hub at the base of a stylus arm. Supports are rigidly attached to the cradle for a suitable cover plate over the hub and parallel to the axis of the stylus arm trunnions to capture the hub in the cradle. A flat anchoring spring is hinged at the rear of the cover and passed between it and the base of the stylus arm. A flat biasing spring longer than the anchoring spring is similarly hinged to allow rotation of both springs about an axis parallel to the trunnion axis. A self-locking screw passes through the cover plate to bear against the bias spring which in turn bears against the anchoring spring. In a preferred embodiment, both springs are rigidly connected to each other and a single hinge strap to facilitate adjusting the anchoring and bias forces by a single screw. However, if desired, two self-locking screws may be employed, one to the rear of the other passing through a hole provided in the biasing spring, in which case the two springs are hinged separately.

Although features of the invention to be protected are pointed out in the appended claims, illustrative embodiments of the invention together with further objects and advantages are described by way of example only with reference to the drawings in which:

Figures 1, 2:
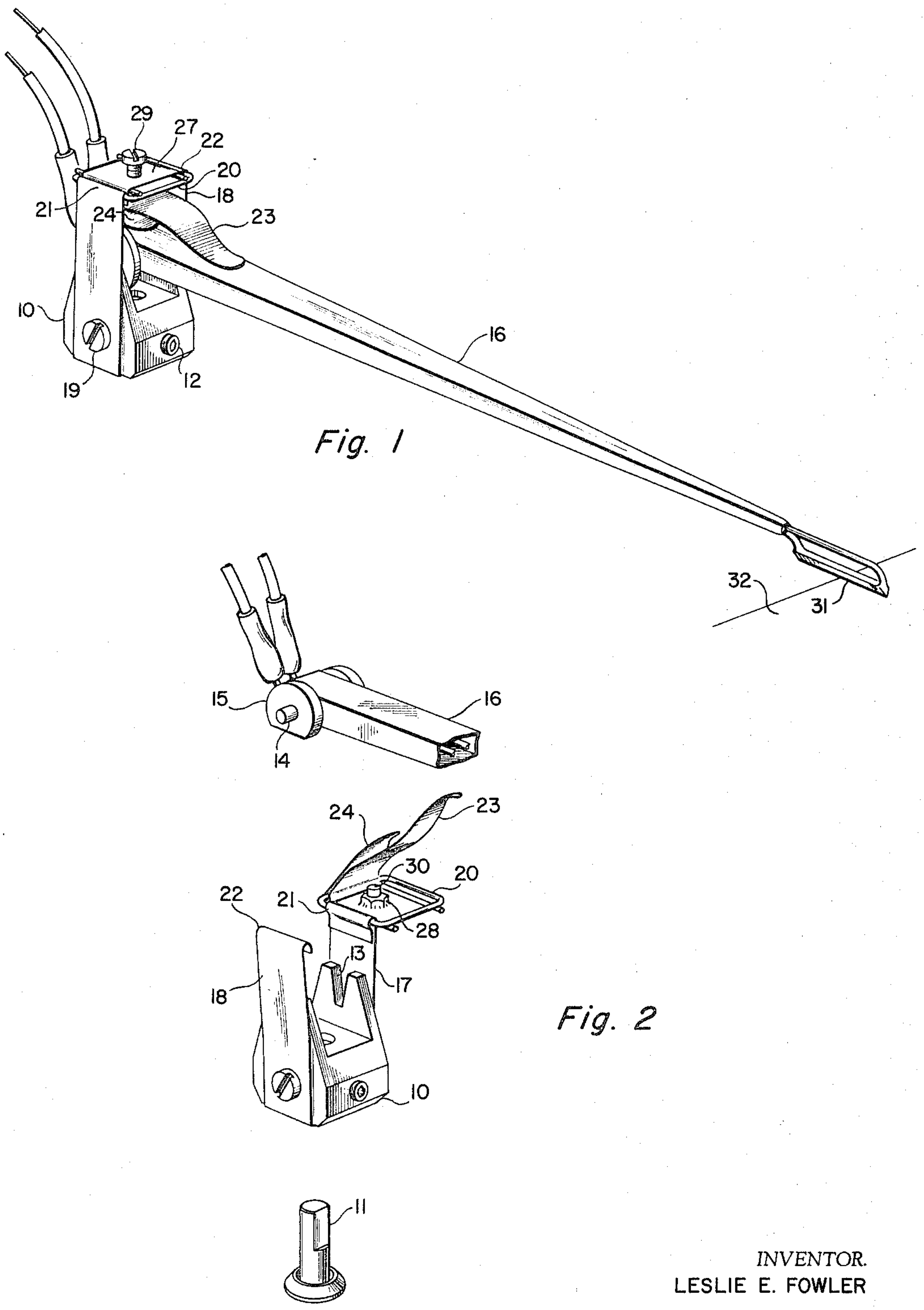
FIGURE 1 illustrates an embodiment of the invention installed in a recorder.
FIGURE 2 illustrates the embodiment of the invention illustrated in FIGURE 1, but not installed in a recorder.
Figures 3, 4:
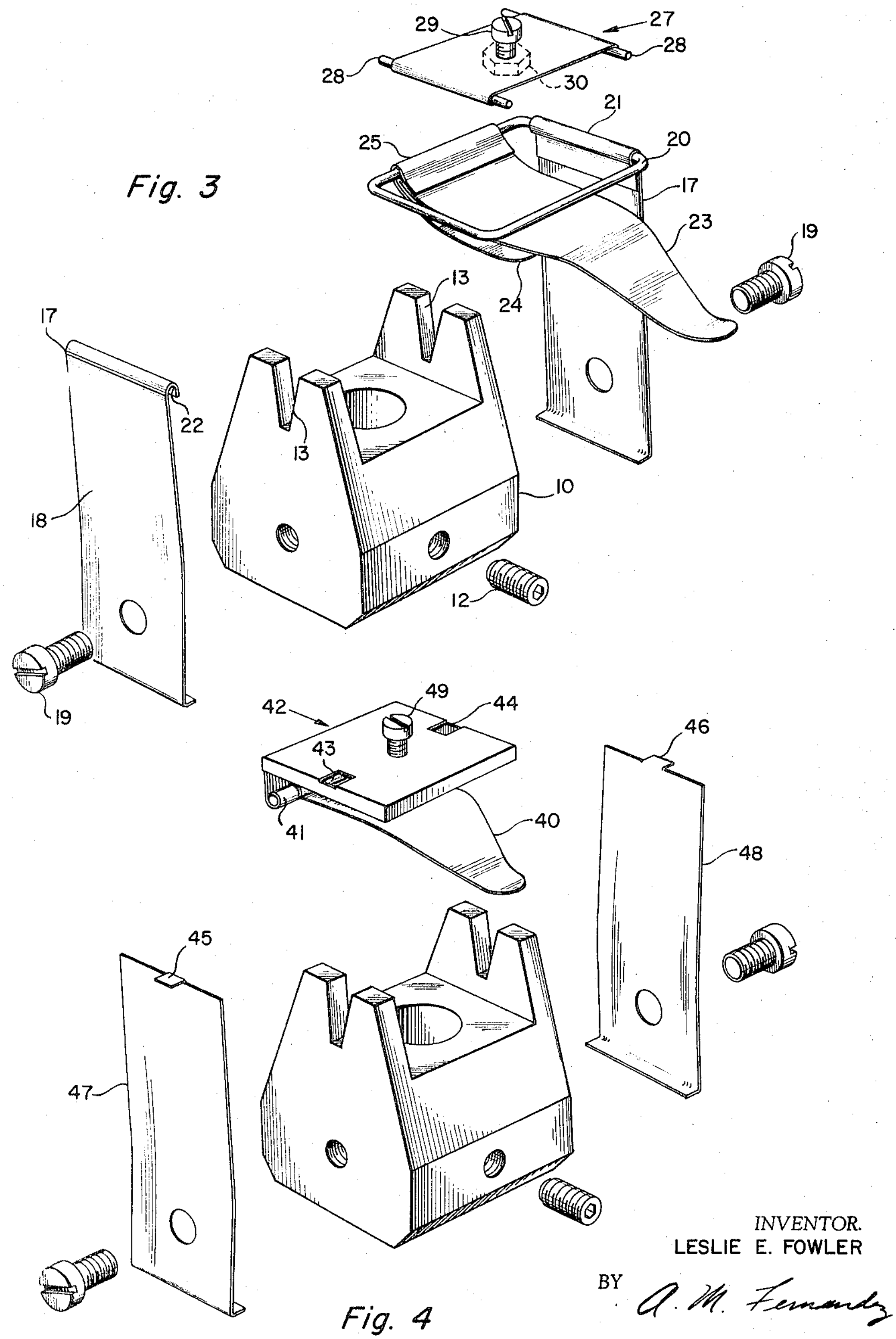
FIGURE 3 illustrates an exploded view of the invention illustrated in FIGURES 1 and 2.
FIGURE 4 illustrates another embodiment of the invention.

As viewed in FIGURES 1, 2 and 3 of the drawings, a preferred embodiment of the invention is shown which comprises a cradle 10 adapted to be rigidly attached to the output shaft 11 of a pen motor (not shown) by means of a set screw 12. The top of the cradle is relieved and provided with two slots or V-type bearings 13 which accept trunnions 14 extending from a hub 15 at the base of a stylus arm 16. Supports 17 and 18 are rigidly attached to the cradle 10 by screws 19. A bail 20 is connected to the support 17 by a hinge 21 and is adapted to be latched on the opposite side by a hook-formed end 22 of the support 18. A flat biasing spring 23 and a flat anchoring spring 24 are connected to a hinge 25 on the bail 20 along the back 26 thereof. As shown, the springs 23 and 24 are rigidly connected to the hinge 25 so that a downward force on the biasing spring 23 will also be applied to the anchoring spring 24 to rotate it about the bail along the back side 26, which is parallel to the axis of the trunnions 14, and against the hub 15 of the stylus arm 16 when it is in proper position in the cradle 10.

To place the hub 15 in the cradle 10, the bale 20 is swung out on its hinge 21 as shown in FIGURE 2. Once the hub has been put in place with the trunnions 14 in the V-type bearings 13, the bail 20 is swung back to the position shown in FIGURE 3 and held in place by the hooked end 22 of the support 18 which is made for that purpose of flexible material, such as spring steel, thereby capturing the hub 15 in the cradle 10 as shown in FIGURE 1.

A cover plate 27 is fixedly attached to rods 28 which are in turn fixedly attached to the top of the bail 20 so that when the bail is in place over the hub 15 as shown in FIGURE 1, a self-locking screw 29 passing through the cover plate 27 will bear downwardly against the biasing spring 23 to provide a bias force on the stylus arm 16. As noted hereinbefore, the force of the screw 29 against the biasing spring 23 is translated to the anchoring spring 24 through the hinge 25. In that manner, an anchoring force is provided to retain the trunnions 14 in the V-type bearings 13. A nut 28 is rigidly attached, as by welding, to the cover plate 27 to receive the self-locking screw 29. Thus, the screw 29 and nut 30 provide a self-locking nut and screw assembly. Once the force exerted by the biasing spring 23 has been adjusted, the stylus arm 16 may be removed for maintenance or replacement without again having to make the adjustment by simply unhooking and rehooking the bail.

It should be noted that the force exerted by the anchoring spring 24 is not critical and may be much greater than the biasing force exerted by the spring 23. Accordingly, the force exerted by the anchoring spring 24 may be set indirectly through the biasing spring 23 as it is adjusted to provide the desired biasing force for the stylus arm.

The anchoring spring 24 being much shorter than the biasing spring 23, the force retaining the hub 15 in place is always much greater than the force biasing the stylus arm against the record medium if both springs are made of the same material.

FIGURE 1 illustrates the stylus arm 16 installed in a recorder using a heating element 31 for producing a trace or record on suitable recording paper 32 in a manner well known to those skilled in the art. The cradle is mounted on the drive shaft 11 shown in FIGURE 2 and rigidly attached thereto by a set screw 13. Accordingly, the entire assembly rotates to deflect the stylus 31 over the record medium 32 at a constant pressure to insure good recording throughout the frequency range of the instrument. At high frequencies the hub would tend to rock in the cradle if only the bias spring 23 were provided, and not the anchoring spring 24.

In operation, the trunnion 14 extending from the hub 15 rests in the V-type bearings 13 the sides of which have a very acute angle of incidence to provide a wedging action when the hub 15 is forced downwardly. The bail 20 is held in place under the hook-formed end 22 of the latching support 18 by the action of the anchoring spring 24 which urges the bail 20 upwardly. The anchoring spring 24 simultaneously presses downwardly on the stylus arm 16 at a point immediately forward of the pivot point of the cradle and arm assembly. In that manner the anchoring spring 24 wedges the trunnion in the V-type bearing to anchor the hub 15 in the crandle 10. The anchoring spring 24 also provides a very slight bias on the stylus arm. The biasing spring 23 is longer than the anchoring spring and therefore has a higher compliance than the anchoring spring 24 in order that the bias force on the stylus arm 16 urging it against the record medium 32 may be more exactly adjusted by the self-locikng screw 29.

To remove the stylus arm 16 for any reason, such as for cleaning or replacement the bail 20 is depressed to allow the latching support 18 to be moved away from the bail, thereby completely freeing the hub 15 for removal from the cradle 11. To facilitate unlatching the bail 20 from the hook-formed end of the latching support 18, the latching support 18 may be made of spring material and bent slightly away from the cradle. When the bail is closed over the hub 15 in the cradle 10, the latching support 18 may be pressed in against the hub 10 to allow the end 22 to hook over the bail. The force of the anchoring spring 24 forcing the hub 15 downwardly presses the bail 20 against the hook-formed end 22 to hold it in the latched position. To unlatch the bail, the cover plate 29 is pressed downwardly to allow the latching support 18 to spring away from the bail 20.

Since the self-locking screw 29 remains stationary relative to the cover plate 29, the same or different stylus arm may be placed in the cradle 10 and the bail 20 again latched over the hub without changing the bias of the stylus 31 against the record medium 32. If a different type of stylus is employed, the bias can be readily adjusted through the self-locking screw 29.

A single biasing and anchoring spring may be employed in place of the two springs 23 and 24 to both retain the hub 15 in the cradle 10 and provide the optimum bias of the stylus 31 against the record medium 32 with the same advantage of easy removal and replacement of the stylus arm 16 and without the necessity of having to readjust the self-locking screw 29 for optimum bias. FIGURE 4 illustrates an embodiment employing a single spring 40 connected by a hinge 41 to a cover plate 42 formed from a metal plate with the edges thereof folded downwardly and holes 43 and 44 cut out to receive tabs 45 and 46 on supports 47 and 48, both of which are bent away from each other. When the supports 47 and 48 are drawn toward each other, and the cover plate 42 is placed in proper position, the tabs 45 and 46 will pass through the holes 43 and 44, respectively. Once the cover plate is properly seated, the supports 47 and 48 spring away from each other to lock the cover plate in place.

To effectively perform both of the anchoring and biasing functions with the single spring 40, a length intermediate that of the biasing spring 23 and the anchoring spring 24 of FIGURE 1 should be selected for it. Alternatively, a material may be selected for the single spring 40 having less compliance than the material employed when two springs are provided. Still another obvious alternative is to vary both the length of the biasing spring and the material in order to provide a sufficient anchoring force with a spring 40 of a greater length than would otherwise be satisfactory because the greater the length of the spring 40 the less sensitive it will be to adjustment of the bias force through a self-locking screw 49. In that manner, both the anchoring and biasing force may be provided by one spring and adjusted by one screw.

Figure 5:
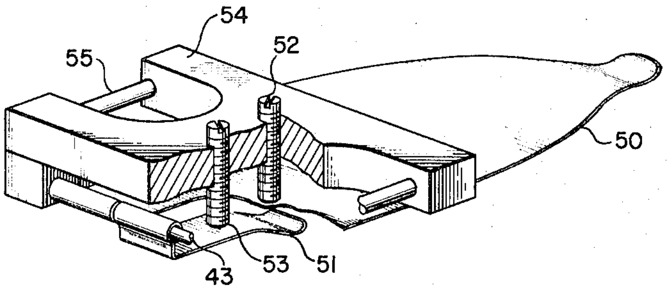
FIGURE 5 illustrates still another embodiment of the invention.

Still another embodiment of the present invention is illustrated in FIGURE 5 which shows two springs 50 and 51 independently hinged, and two adjusting screws 52 and 53, one for each spring, the adjusting screw 53 for the anchoring spring 51 passing through an opening in the biasing spring 50. A molded cover plate 54 is employed with tapped holes for receiving the screws 52 and 55 employed to adjust the separately hinged biasing spring 50 and anchoring spring 51. The bail 55 is molded into the cover plate 54 in order that it may be hinged on one support and latched by the hook-formed end of the other support as in the embodiment of FIGURE 1. The two springs 50 and 51 are independently hinged on the back side 56 of the cover plate 54. By independently hinging the two springs in that manner, the anchoring force may be independently adjusted.

Figure 6:
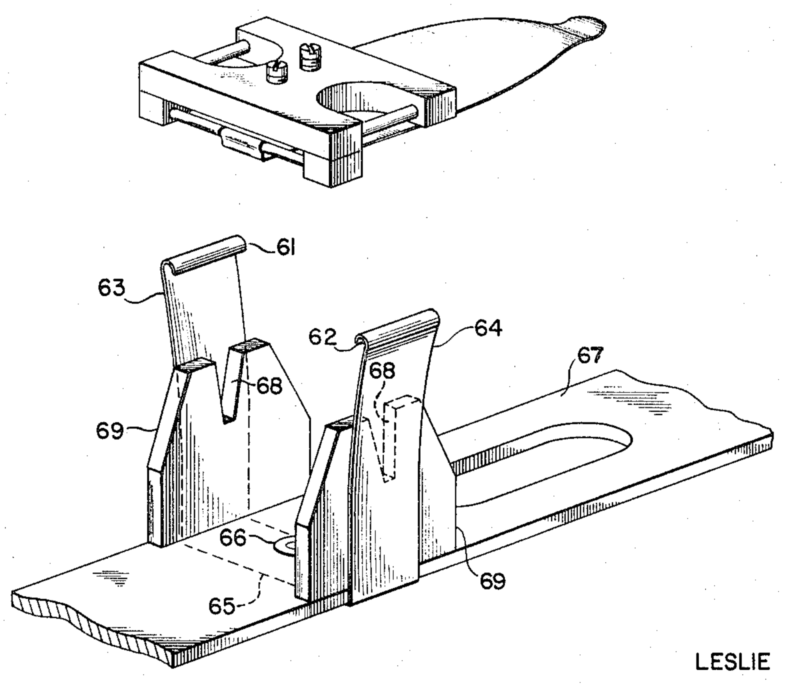
FIGURE 6 illustrates yet another embodiment of the invention.

FIGURE 6 illustrates another embodiment of the present invention. An important difference over the other embodiments is the provision of hook-formed ends 61 and 62 on two supports 63 and 64 so that the cover plate, which may be of the embodiment of FIGURE 5 as shown or of the embodiment of FIGURE 1, may be hooked in place on both sides instead of being hinged on one side and hooked in place on the other. Another important difference is that the supports 63 and 64 are connected by a cross member 65 having a hole 66 so that it may be riveted, or otherwise fastened, to a link 67 of a mechanism employed to provide rectilinear recording such as a floating arm in a mechanism for converting limited angular motion to straight line motion as described in a copending U.S. application Ser. No. 479,864 filed Aug. 16, 1965, now U.S. Patent 3,312,980, and assigned to the same assignee of the present application. For such a use of the present invention, slot or V-type bearings 68 are provided on upright cradle members 69 formed as integral parts of the link 67 instead of in a separate cradle, although a separate cradle of the form illustrated in FIGURE 3 could obviously be fastened to the link.

While the principles of the invention have now been made clear in several illustrative embodiments, there will be immediately obvious to those skilled in the art many modifications in structure, arrangement, proportions, materials and components used in the practice of the invention, and otherwise, which are particularly adapted for specific applications and operating requirements, without departing from those principles. The appended claims are therefore intended to cover and embrace any such modifications, within the limits only of the true spirit and scope of the invention.

What is claimed is:

1. In a recorder, the combination comprising
an elongated arm having a recording stylus on one end and a hub at the other end thereof,
a trunnion extending from each side of said hub,
a cradle rigidly attached to a drive mechanism and having two upright members, each with a V-type bearing adapted to receive a trunnion extending from said hub, a cover plate adapted to capture said hub in said cradle, with said trunnions resting in said bearings, said cover plate having at least one flat spring connected to one side thereof, with said spring passing between said cover and said hub and extending in a direction along said stylus arm, two support members, each disposed on a different side of said cradle proximate one of said V-type bearings and each with a means for securing said cover in a proper position for capturing said hub in said cradle, one of said means comprising a latching portion of a support so formed as to hook over a portion of said cover plate to latch it in said proper position against the force of said spring, and means for adjusting the force of said spring against said stylus arm, said adjusting means being fastened to said cover plate, whereby said cover plate may be unlatched for said stylus arm to be easily removed without disturbing the adjustment of said force.

2. In a recorder, the combination as defined in claim 1 wherein said cover plate has two flat springs hinged from the same side thereof, one spring being shorter than the other, and disposed between the other and said stylus arm when said cover is in proper position, and said means for adjusting the force of said one spring comprises means for adjusting the force of the second spring, whereby the predominant force for retaining said trunnions in the V-type bearings is provided by the shorter one of said springs and the predominant force for biasing said stylus against a record medium is provided by the longer one of said springs.

3. In a recorder, the combination as defined in claim 2 wherein said means for adjusting the force of said second spring is independent of said means for adjusting the force of said one spring.

4. In a recorder, the combination as defined in claim 1 wherein the other of said means for securing said cover in a proper position for capturing said hub in said cradle comprises a hinging connection.

5. In a recorder, the combination as defined in claim 1 wherein said means for adjusting the force of said spring comprises a perforation through said cover with internal screw threads and a screw passing therethrough.

6. In a recorder, the combination as defined in claim 2 wherein said means for adjusting the force of said second spring independently of adjusting the force of said one spring comprises two perforations through said cover, each with internal screw threads and a screw passing therethrough, and a larger opening in the longer one of said flat springs so positioned as to allow one of said screws to pass therethrough to the shorter one of said flat springs.

7. In a recorder, the combination as defined in claim 5 wherein the other of said means for securing said cover in a proper position for capturing said hub in said cradle comprises a hinging connection.

8. In a recorder, the combination as defined in claim 1 wherein said cradle is mounted on a drive shaft of a recorder for curvilinear recording.

9. In a recorder, the combination as defined in claim 1 wherein said cradle is formed as an integral part of a link in a drive mechanism adapted for rectilinear recording.

10. In a recorder, the combination as defined in claim 9 wherein said two support members are connected by a cross member to form a single V-shaped member fitted over said link.

References Cited

UNITED STATES PATENTS

| | | | |
|---|---|---|---|
| 689,529 | 12/1901 | Wolfe | 346—140 |
| 2,199,078 | 4/1940 | Lindemann | 346—140 |
| 3,187,332 | 6/1965 | Barter et al. | 346—139 |
| 3,312,980 | 4/1967 | Erbach | 346—139 |

RICHARD B. WILKINSON, *Primary Examiner.*

JOSEPH W. HARTARY, *Assistant Examiner.*